A. W. HALL.

Improvement in Anti-Friction Bearings for Journals, &c.

No. 115,602.

Patented June 6, 1871.

115,602

UNITED STATES PATENT OFFICE.

ALEX. W. HALL, OF NEW YORK, N. Y.

IMPROVEMENT IN ANTI-FRICTION BEARINGS FOR JOURNALS.

Specification forming part of Letters Patent No. 115,602, dated June 6, 1871.

*To all whom it may concern:*

Be it known that I, ALEX. W. HALL, of the city, county, and State of New York, have invented certain new and useful Improvements in Anti-Friction Bearings for Journals and Axles; and I do hereby declare that the following is a full, clear, and exact description of the same, reference being had to the accompanying drawing forming a part of this specification.

Figure 2:
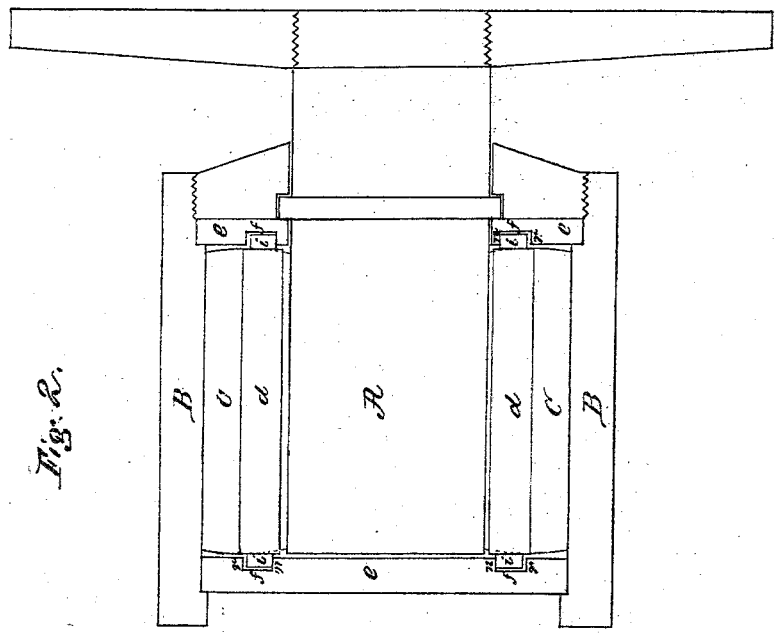
Figure 1:
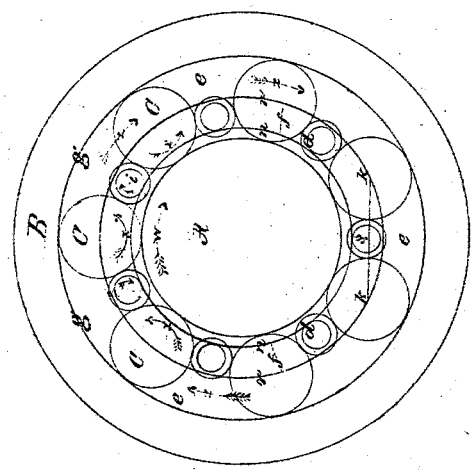

Figures 1 and 2 represent, respectively, an end and a sectional view of my device, like letters referring to like parts.

To enable others to understand the construction and operation of my invention, I will proceed to describe it with reference to the drawing.

A A is a journal or axle. B is a journal-box or hub. C C are bearing-rollers in contact with journal A, and hub B at its inner surface $g\ g$. $d\ d$ are separating-rollers, employed to prevent contact between rollers C C. $i\ i$ are journals, projecting from ends of rollers $d\ d$. $e\ e$ are plates, placed near the ends of the rollers C C $d\ d$, and fast to the hub or box, with circular grooves $f\ f$ in their inner faces, into which the journals $i\ i$ are inserted. The width of these grooves somewhat exceeds the diameter of the journals, so that the journals $i\ i$, when pressed against the inner bearings $n\ n$, do not touch the outer bearings $r\ r$.

The distinctive feature of my invention is to support the rollers $d\ d$ between the rollers C C without friction.

The separating-rollers $d\ d$ are made slightly too large to pass outward between the rollers C C, (placed equidistant from each other about the journal A,) and are held in contact with rollers C C, and free from contact with journal A by the circular bearings $n\ n$, supporting the journals $i\ i$. The groove-bearings $n\ n$ and the journals $i\ i$ are constructed in a common ratio to the circumference $g\ g$ and the circumference $d\ d$, respectively. In this arrangement and proportion of parts, motion being applied to the journal A in the direction of the arrow $w$, the rollers C C $d\ d$ will move axially in the direction of the arrows $x\ x$, and bodily in the direction of the arrows $z\ z$, and the journals $i\ i$ will roll around the circular bearings $n\ n$ without friction. The only friction possible will arise from the occasional contact of the ends of the rollers C C $d\ d$ with the end plates $e\ e$, between which they are allowed slight longitudinal motion.

The operation of my invention is the same, whether the journal A revolves and the box B remains stationary, or the box revolves and the journal remains fixed.

Having thus explained the construction and operation of my invention, what I claim as new, and desire to secure by Letters Patent, is—

1. In combination with the journal or axle A and the box or hub B, the rollers C C and $d\ d$, journals $i\ i$, and circular bearings $n\ n$, all arranged to operate substantially as and for the purposes set forth.

2. Placing the center of the rollers $d\ d$ within the center line $k\ k$, substantially as shown, and for the purposes specified.

3. The outer walls $r\ r$ of the grooves $f\ f$, in close proximity to the journals $i\ i$, substantially as and for the purposes shown.

ALEX. W. HALL.

Witnesses:
 DAVID P. MURPHY,
 R. F. STEVENS.